Figures 1, 2, 3:
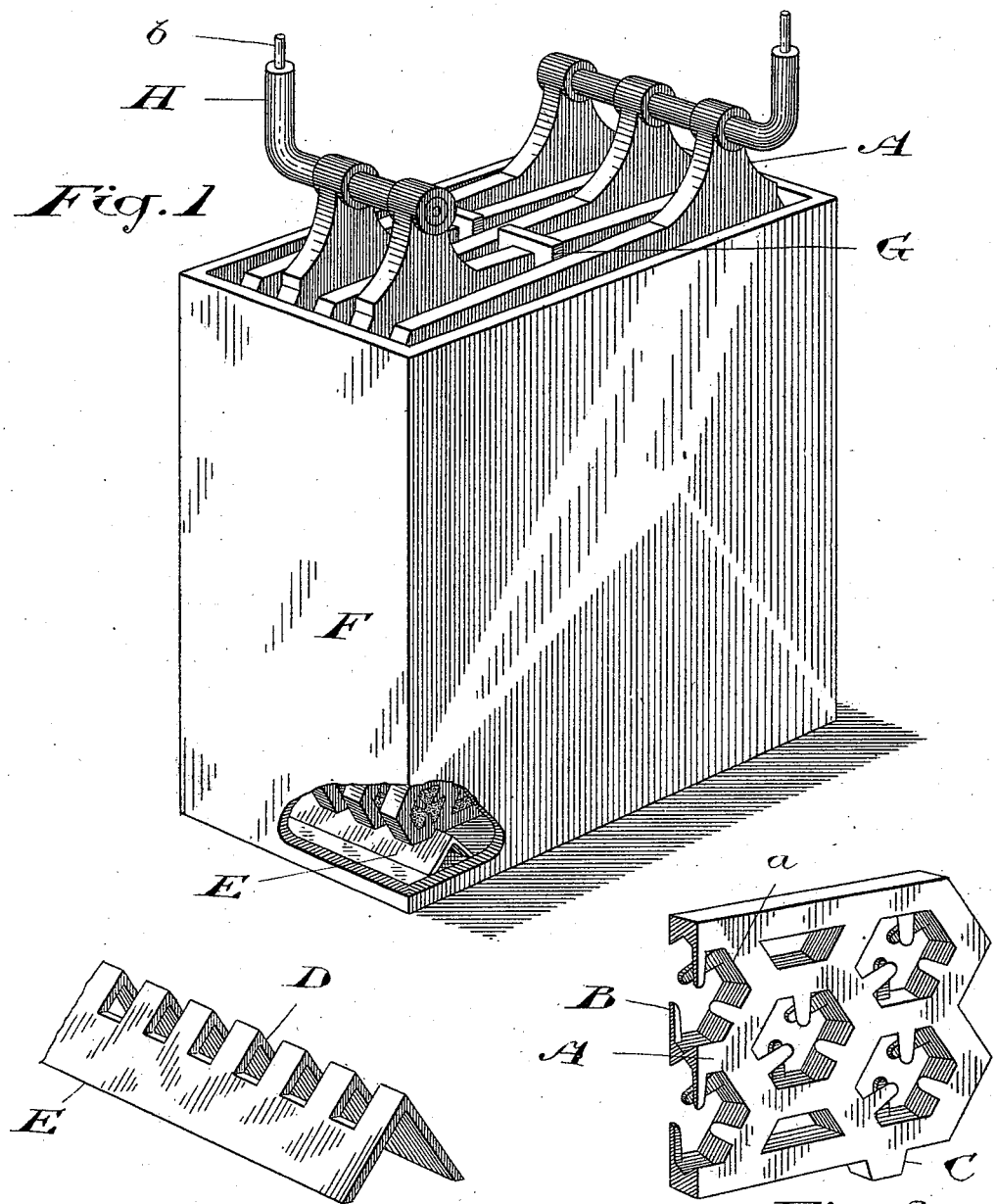

(No Model.)

G. L. BALLARD.
SECONDARY BATTERY.

No. 517,018. Patented Mar. 27, 1894.

Witnesses
J. Edw. Maybee
J. O. Cameron

Inventor
Geo. L. Ballard
by Donald C. Ridout & Co
Attys.

UNITED STATES PATENT OFFICE.

GEORGE L. BALLARD, OF TORONTO, CANADA.

SECONDARY BATTERY.

SPECIFICATION forming part of Letters Patent No. 517,018, dated March 27, 1894.

Application filed April 27, 1893. Serial No. 472,017. (No model.)

*To all whom it may concern:*

Be it known that I, GEORGE LAWSON BALLARD, of the city of Toronto, in the county of York and Province of Ontario, Canada, have invented a certain new and Improved Secondary Battery, of which the following is a specification.

The object of the invention is to design a secondary battery in which the active material in the electrodes shall be permanently fixed in position and in which the electrodes shall be separately held to prevent the possibility of coming in contact with each other, and it consists in the peculiar construction, arrangement and combinations of parts hereinafter more particularly described and then definitely claimed.

In the accompanying drawings—Figure 1, is a perspective detail of my improved battery. Fig. 2, is a detail of a portion of my improved electrode. Fig. 3, is a perspective detail of the stand or bridge for holding the plates or electrodes.

In the drawings—A, is the electrode, which consists of a plate made of lead or other suitable material which is cast solid with a series of holes $a$, of any suitable shape, but recessed as shown in Fig. 2, so that the center of each hole shall be larger in diameter than its edges in order to rigidly hold the active material when it is cast in the hole. In order to still further hold the active material rigidly, I cast, in making the plate, a series of lips or fingers B, which project as indicated in Fig. 2, from the edge of each hole.

In the bottom edge of each plate or electrode A, I cast two or more feet C, designed to fit into a notch or recess D, made in the bridge or stand E. This bridge is made of hard rubber and is designed to fit into the bottom of the cell F, a bridge or stand E, being made for each end of the said cell to separately support the electrodes A, as indicated, the tops of the said electrodes being separated by the hard rubber clips G. The terminal H, by which the proper electrodes are connected together, consists of a copper core $b$, incased in lead. This provides, comparatively speaking, a light terminal with a large conducting capacity which I consider very important.

What I claim as my invention is—

1. In a secondary battery, a bridge or stand E, a notch or recess D in said stand, and a plate provided with a foot C adapted to enter said recess, substantially as described.

2. In a secondary battery and in combination with a bridge or stand having notches or recesses therein, a plate of solid lead made in one piece and having a series of holes cast therein, said holes being recessed so that the center of each hole is larger in diameter than its edges, a series of lips or fingers projecting from the edges of said holes, and feet C projecting from said plate, adapted to enter the notches or recesses in said bridge or stand, substantially as described.

Toronto, March 28, 1893.

GEORGE L. BALLARD.

In presence of—
J. EDW. MAYBEE,
W. G. MCMILLAN.